(12) United States Patent
Ermanoski

(10) Patent No.: US 9,815,042 B1
(45) Date of Patent: Nov. 14, 2017

(54) CASCADING PRESSURE REACTOR AND METHOD FOR SOLAR-THERMOCHEMICAL REACTIONS

(71) Applicant: National Technology & Engineering Solutions of Sandia, LLC, Albuquerque, NM (US)

(72) Inventor: Ivan Ermanoski, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 219 days.

(21) Appl. No.: 14/549,331

(22) Filed: Nov. 20, 2014

(51) Int. Cl.
*C01B 3/10* (2006.01)
*B01J 8/08* (2006.01)
*B01J 19/12* (2006.01)

(52) U.S. Cl.
CPC .................................. *B01J 19/127* (2013.01)

(58) Field of Classification Search
CPC ........ Y02P 20/134; Y02E 10/41; Y02E 60/36; B01J 2208/00539; B01J 2208/00557; B01J 8/087; B01J 2208/0084; B01J 2208/00451; B01J 8/10; B01J 2208/00495; B01J 7/02; B01J 8/0055; F28D 2021/0022; F28D 7/026; C01B 3/063; F24J 2/07; F28F 1/42
See application file for complete search history.

(56) References Cited

U.S. PATENT DOCUMENTS 8,420,032 B1 * 4/2013 Ermanoski ............... B01J 8/087
422/198

* cited by examiner

*Primary Examiner* — Colleen Dunn
*Assistant Examiner* — Syed Iqbal
(74) *Attorney, Agent, or Firm* — Daniel J. Jenkins

(57) ABSTRACT

Reactors and methods for solar thermochemical reactions are disclosed. The reactors and methods include a cascade of reduction chambers at successively lower pressures that leads to over an order of magnitude pressure decrease compared to a single-chambered design. The resulting efficiency gains are substantial, and represent an important step toward practical and efficient solar fuel production on a large scale.

20 Claims, 4 Drawing Sheets

US 9,815,042 B1

CASCADING PRESSURE REACTOR AND METHOD FOR SOLAR-THERMOCHEMICAL REACTIONS

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

TECHNICAL FIELD

Embodiments of the present invention relate to solar thermochemical fuel production and more particularly relate to a thermochemical reactor having two or more thermal reduction chambers operating at different pressures.

BACKGROUND

Solar concentration systems typically entail optics (mirrors or lenses) to focus a large area of sunlight, or solar thermal energy, onto a small area. The solar thermal energy may drive a heat engine, such as a steam turbine, which may be further coupled to an electrical power generator to convert a portion of the solar thermal energy into electricity. Solar concentration systems may also drive a thermochemical reaction to generate a fuel that chemically stores a portion of the solar thermal energy. Water splitting, gasification of coal, and reforming of methane are all under investigation as potential solar thermochemical fuel production techniques. Solar concentration systems may drive other important reactions on an industrial scale as well, such as $CO_2$ reduction into CO, for example.

Many solar thermochemical reactions entail a redox cycle. In a water splitting reaction to produce hydrogen from water, a metal-oxide redox pair is thermally reduced and the reduced reactive media then drives decomposition of water. The metal oxide is then reduced again to repeat the cycle. While identifying advantageous metal-oxides is currently a subject of research, thermodynamic considerations dictate the thermal reduction portion of the cycle generally requires a high temperature, typically between 1000-2000° C., depending on the reactive oxide chosen and other conditions in the system.

Solar thermochemical reactors can take many forms, affording more or less efficient fuel production, scalability, etc. One conventional system utilizes a honeycomb substrate that is coated with the reactive oxide. The honeycomb substrate is alternately exposed to collected solar energy to heat the system and reduce the reactive oxide, and to a reactant gas, such as $H_2O$ in the case of water splitting, to generate fuel. Such a reactor is essentially a fixed bed, and as such, suffers temperature non-uniformities and low thermal efficiency because much of the solar energy is expended on heating non-reactive portions of the bed (e.g., honeycomb substrate) and is ultimately rejected from the system as waste heat, rather than utilized for fuel production. Also, with each redox cycle, the entire system undergoes extreme thermal cycling, leading to component fatigue.

Two-step thermochemical cycles are a conceptually simple, theoretically highly efficient, and promising approach for solar fuel production. In the first step, thermal reduction, a reactive material (oxide) is partially or fully reduced at high temperature (typically 1600-1800 K). In the second step, fuel production, the reduced oxide is exposed to steam or $CO_2$ at a lower temperature (1100-1500 K), to produce $H_2$ or CO.

Efficiencies achieved in experiments have been much lower than theoretical limits, largely owing to the performance of existing reactive oxides. The low reversible oxygen capacity of these oxides results in low $H_2$ or CO yields per mole oxide per cycle, leading to large energy requirements for oxide heating. Increasing the per-cycle yield has proven to be challenging, requiring high thermal reduction temperatures ($T_{TR}$) and low thermal reduction pressures ($p_{TR}$). High temperatures cause excessive aperture radiation losses and require the use of specialized construction materials, limiting $T_{TR}$ to <1800 K. Low pressures can be achieved by inert gas sweeping or vacuum pumping, both facing limitations for reasonably-scaled commercial systems (1-10 MW). Sweeping requires large amounts of high-purity gasses and extensive high-temperature heat recovery, whereas pumping requires excessively large vacuum pumps, limiting the minimum achievable $p_{TR}$.

A system which avoids many of the difficulties and efficiency limitations associated with existing reactors would advance the art of solar thermochemical fuel production.

SUMMARY OF THE DESCRIPTION

Reactors and methods for solar thermochemical reactions are described herein. Embodiments of reactors provide at least two distinct reactor reduction chambers between which there is at least a pressure differential. In embodiments, multiple thermal reduction chambers are used to achieve low $p_{TR}$. The successively lower pressures are obtained by pumping.

In an embodiment, a solar thermochemical reactor is disclosed that includes a thermal reduction zone to thermally reduce a plurality of reactive particles through direct heating by solar energy thereby producing a plurality of reduced particles. The thermal reduction zone includes two or more thermal reduction sub-zones operating at a corresponding two or more decreasing pressures, and the pressure decreases in the direction of particle flow.

In another embodiment, a method for reducing a redox active material is disclosed that includes thermally reducing a plurality of reactive particles in a thermal reduction zone through direct heating by solar energy to produce a plurality of reduced particles. The thermal reduction zone includes two or more thermal reduction sub-zones operating at a corresponding two or more decreasing pressures, and the pressure decreases in the direction of particle flow.

BRIEF DESCRIPTION OF THE DRAWINGS

Embodiments of the present invention are illustrated by way of example, and not limitation, in the figures of the accompanying drawings in which.

DETAILED DESCRIPTION

Figure 1:
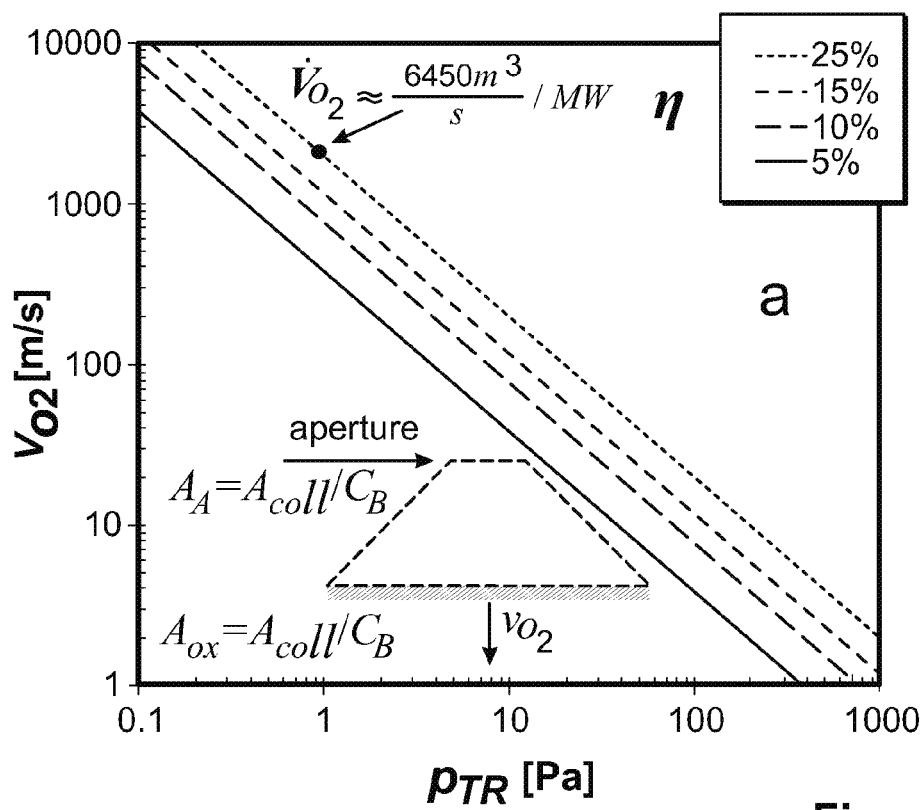
FIG. 1 is a graph showing flow velocity as a function of thermal reduction pressure according to an embodiment of the disclosure.

Described herein are solar thermochemical reactors using cascading pressure thermal reduction and methods of operation. In the following description, numerous details are set forth. It will be apparent, however, to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause and effect relationship).

The reactive particles applicable to the systems and techniques described herein may generally be of any type known for thermochemical reactions that are further suitable for conveyance by the systems and techniques described herein. Although the reactive particles are not consumed significantly with each reaction cycle in the exemplary embodiments described herein, one of skill in the art will note the systems and techniques described herein enable particle continuous addition and are therefore readily adaptable to embodiments where the reactive particles may be consumed (e.g., volatilized) and replenished. Reactive particles applicable to the systems and techniques described herein may be a solid media of homogenous or heterogeneous composition (e.g., carrier media coated with reactive media) and of various porosity. While the exemplary embodiments utilize a metal oxide ($MO_x$), such as ceria ($CeO_2$), ferrite, manganite, cobalt oxide, and the like, alternative embodiments may employ any other known particle composition capable of similar cyclic redox reactions. Reactive particles applicable to the systems and techniques described herein may also vary in size significantly with smaller sizes having higher surface/volume ratios improving reaction rates, but potentially being more susceptible to sintering and/or melting. For one exemplary ceria particle embodiment, particle size is between about 5 μm (microns) and 500 μm (microns).

Reactions (1) and (2) below, generically describe a two-step thermochemical cycle for $H_2$ production, based on a reactive metal oxide ($MO_x$). Reaction (1) is an endothermic thermal reduction of the oxide carried out at a temperature $T_{TR}$ and pressure $p_{TR}$. Reaction (2) is the mildly exothermic reoxidation of the reduced oxide with $H_2O$, at temperature $T_{WS}$, which yields $H_2$ and restores the oxide to its initial state. The process can also be used to produce CO from $CO_2$ in reaction (2). The sum of the two reactions is heat-driven $H_2O$ splitting, described by reaction (3):

$$\frac{1}{\delta_{TR}-\delta_{WS}}MO_{x-\delta_{WS}} \rightarrow \frac{1}{\delta_{TR}-\delta_{WS}}MO_{x-\delta_{TR}} + \frac{1}{2}O_2$$

thermal reduction at $T_{TR}$, $p_{TR}$, $$\frac{1}{\delta_{TR}-\delta_{WS}}MO_{x-\delta_{TR}} + H_2O \rightarrow \frac{1}{\delta_{TR}-\delta_{WS}}MO_{x-\delta_{WS}} + H_2 \quad (2)$$

$H_2O$ splitting at $T_{WS}$, $$H2O \rightarrow H_2 \tfrac{1}{2} O_2 \quad (3)$$

$H_2O$ thermolysis.

Here, $\delta_{TR}$ and $\delta_{WS}$ are the extents of reduction of the oxide following the thermal reduction and water splitting steps. Low $p_{TR}$ (or, more generally, $p_{O2}$) in reaction (1) increases $\delta_{TR}$ and the reversible oxygen capacity $\Delta\delta = \delta_{TR} - \delta_{WS}$. Because the $H_2$ yield per mole oxide per cycle is proportional to $\Delta\delta S$, lowering $p_{TR}$ generally increases efficiency.

Achieving low $p_{TR}$, however advantageous, is challenging. The main difficulty is large $O_2$ volumetric flows—not pumping work, $O_2$ mass flow, or aerodynamic loads. Indeed, a 1MW chemical output corresponds to ~3.5 mol/s $H_2$ and an $O_2$ mass flow rate of only ~55 g/s. Nonetheless, at low pressure, even modest mass flow rates require pumping at large volumetric rates, $\dot{V}_{O_2}$, and at high $O_2$ flow velocities, $v_{O_2} = \dot{V}_{O_2}/A_{ox}$.

To quantify $v_{O_2}$ and $\dot{V}_{O_2}$, consider the surface area of the oxide receiver ($A_{ox}$), illustrated in the inset in FIG. 1.

$$A_{ox} = A_{coll}/C_B \quad (4).$$

Here $A_{coll}$ is the solar collector/concentrator area (e.g. gross heliostat area) and $C_B$ is the concentration ratio at the oxide receiver (roughly 10% of the concentration ratio at the aperture, $C_A$). The chemical output power, P, of a $H_2$-producing reactor, can be expressed in two ways:

$$P = \eta A_{coll} \dot{Q}_S \text{ and } P = \dot{n}_{H_2} HHV_{H2} \quad (5) \text{ and } (6).$$

Here $\eta$ is the reactor solar-to-hydrogen efficiency, $\dot{Q}_S = 1$ kW/m² is the incoming solar flux, $\dot{n}_{H_2}$ is the molar $H_2$ production rate, and $HHV_{H2} = 286$ kJ/mol is the $H_2$ higher heating value. Combining equations (4), (5), (6), and the ideal gas equation, the required $v_{O_2}$ can be expressed as:

$$v_{O_2} = \frac{\eta C_B R T_{TR} * \dot{Q}_S}{2 * HHV_{H2}} \frac{1}{p_{TR}}. \quad (7)$$

FIG. 1 shows flow velocity $v_{O_2}$ (required oxygen flow velocity from an oxide receiver) as function of $p_{TR}$, calculated using eq.(7) for solar to hydrogen efficiency between 5% and 25%. The lower left inset illustrates flow velocity: sunlight from a concentrator (e.g. a heliostat field) enters an aperture (with area $A_A$) and illuminates an oxide receiver from which oxygen is released by thermal reduction. Oxygen leaves the oxide at $v_{O_2}$. A high concentration ($C_A \approx 3000$) was assumed, necessary because of the high $T_{TR}$. $C_B = 300$ is the assumed solar concentration at the oxide bed.

While $v_{O_2}$ is quite reasonable for $p_{TR} \approx 100$ Pa and higher, it reaches hypersonic and even orbital velocity below 1 Pa. For lower values of $C_B$, within a reasonable range, $v_{O_2}$ would be somewhat lower than in FIG. 1, but still excessive at low $p_{TR}$. Assuming a maximum $v_{O_2} \approx 100$ m/s, the lowest feasible $p_{TR}$ is around 20 Pa, illustrating the limits of pumping. Somewhat higher $v_{O_2}$ values could be considered, but with caution regarding practical flow impediments, such as conductance losses in pumping elements and decreased conductance under molecular flow dynamics at low pressures ($p_{TR} \lesssim 1$ Pa). The speed of sound in $O_2$ ($c \approx 800$ m/s at 1773K) is an upper practical limit under all circumstances.

To calculate $\dot{V}_{O_2}$, a normalization with respect to input solar power ($P_S$) is needed. From $C_B = 300$ follows $A_{ox} \approx 1.33$ m²/MW, corresponding to $\dot{V}_{O_2}$ (1 Pa)≈

$$\dot{V}_{O_2}(1Pa) \approx \frac{6450 \text{ m}^3}{\text{s}} \Big/ \text{MW at } \eta = 25\%.$$

This impractically large value further underscores the challenges of vacuum pumping.

Figure 2:
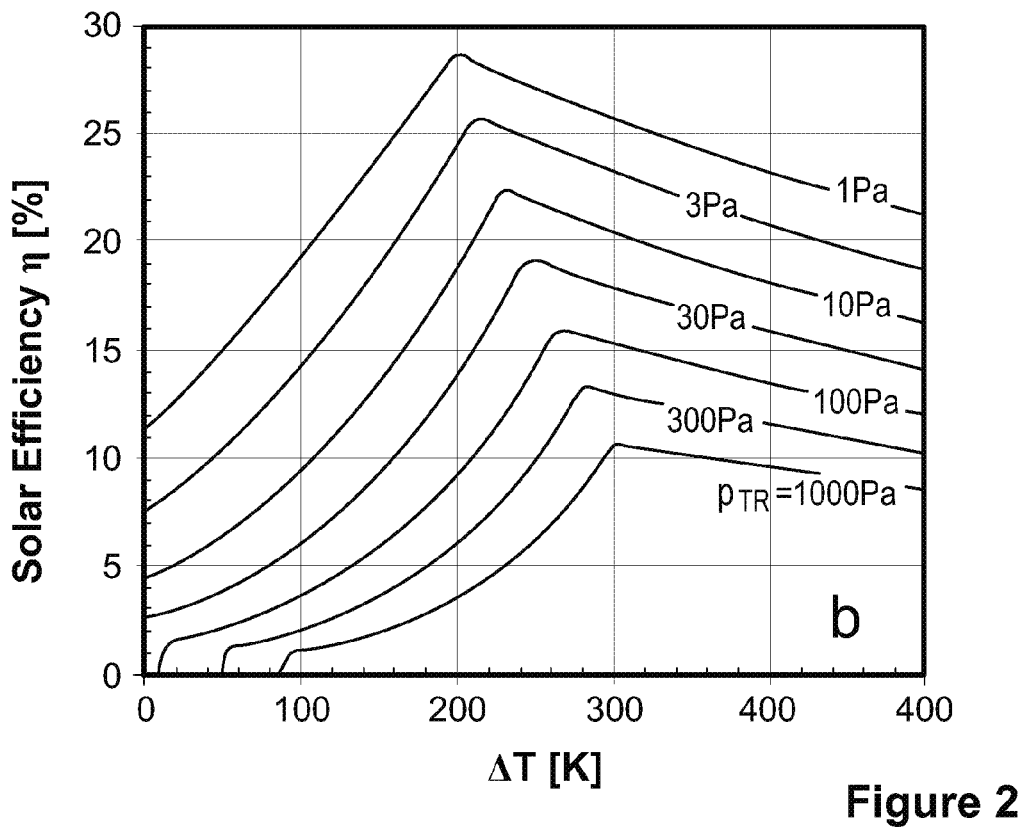
FIG. 2 is a graph showing solar efficiency as a function of $\Delta T$ according to an embodiment of the disclosure.

FIG. 2 shows solar efficiency as a function of $\Delta T$ for a generic ceria-based water-splitting reactor. As can be seen in FIG. 2, efficiency increases with decreasing $p_{TR}$, illustrating the motivation for reaching low $p_{TR}$.

According to the present disclosure, an alternative approach aimed at decreasing $\dot{V}_{O_2}$ and enabling lower $p_{TR}$ limits is disclosed. This approach consists of performing the thermal reduction step in multiple chambers, each operating at a successively lower pressure.

Figure 3:
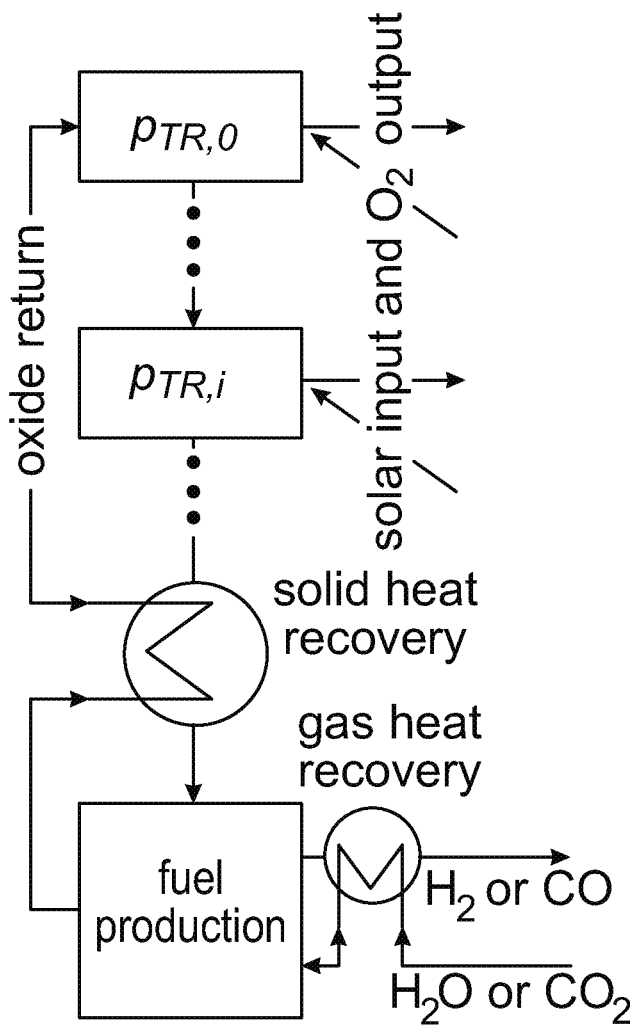
FIG. 3 is an illustration of a reactor according to an embodiment of the disclosure.

FIG. 3 illustrates a solar reactor arrangement or system according to an embodiment of the disclosure. FIG. 3 assumes that pressure separation between chambers is accomplished by a reactive oxide in packed particle bed form, isolation valves between chambers were deliberately omitted as reactor component. As can be seen in FIG. 3, $O_2$ is pumped near the pressure at which it evolves from the oxide at each reduction chamber 0 through i, with only a fraction pumped at the final $p_{TR}$. This series pumping may be referred to as cascading. In the case of a single thermal reduction chamber discussed above, all of the evolved $O_2$ is pumped at the same lowest system pressure. To estimate $p_{TR}$ benefits, a cascade of identically-sized chambers is assumed ($A_{ox,i} = A_{ox}$), though $A_a$ and $C_B$ may differ between chambers. Because using the highest practically achievable $v_{O_2}$ (or $\dot{V}_{O_2}$) leads to the lowest final $p_{TR}$, a chamber-independent $v_{O_2}$ is also assumed ($v_{O_2,i} = v_{O_2}$). From these two assumptions follows $\dot{V}_{O_2,i} = \dot{V}_{O_2}$. Lastly, the amount of evolved oxygen depends on the extent of reduction ($\delta_{TR}$ ($p_{TR}, T_{TR}$)), which is a property of the oxide itself.

Figure 4:
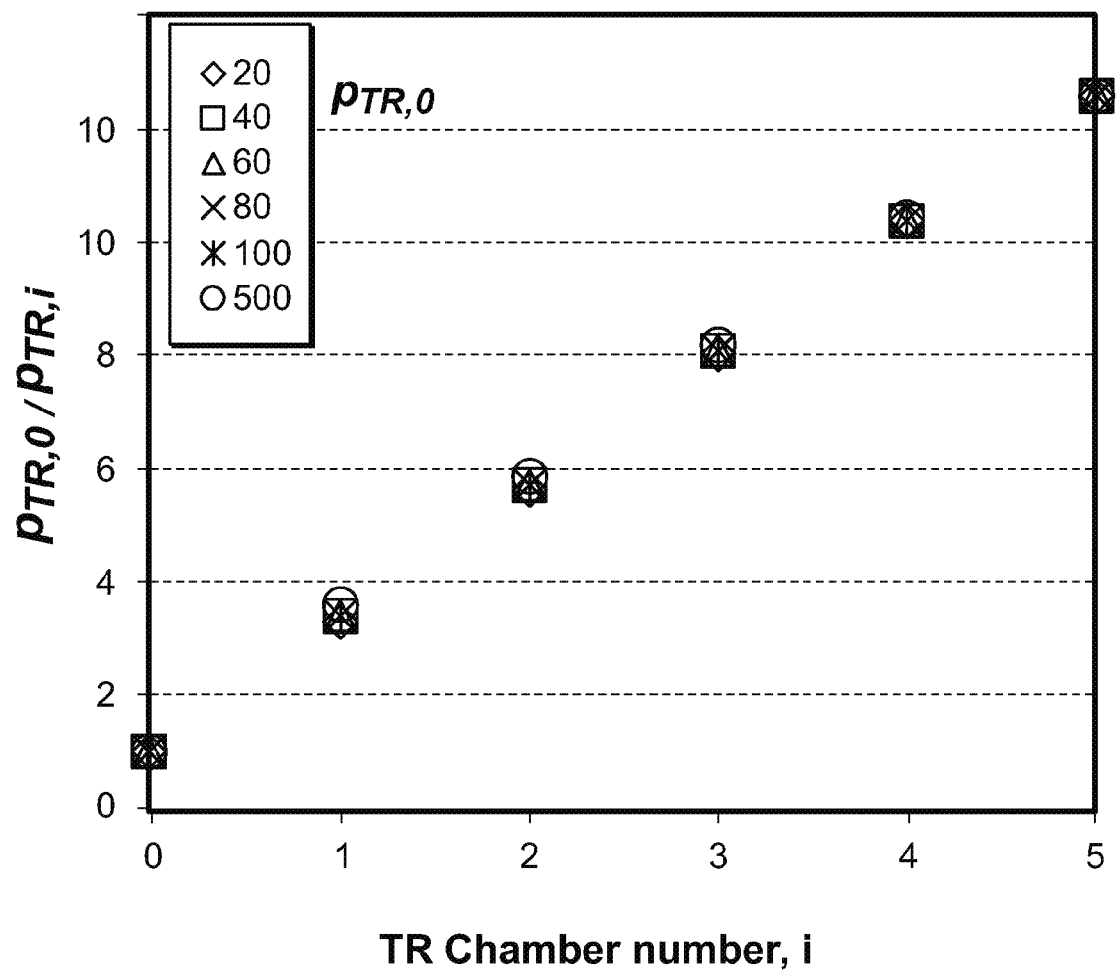
FIG. 4 is a plot showing the pressure ratio between the 0th and ith chamber for a ceria based thermochemical reactor

Under the above assumptions, the pressure in the $i^{th}$ chamber, $p_{TR,i}$, in which the extent of reduction is $\delta_{TR,i} = \delta_{TR}(p_{TR,i})$, is given by a recursive relationship:

$$p_{TR,i} = \dot{n}_{ox} R T_{TR} \frac{\delta_{TR,i} - \delta_{TR,i-1}}{2\dot{V}_{O_2}}, \quad (8)$$

which is simply the ideal gas equation, with the oxygen quantity determined by an oxide molar flow rate $\dot{n}_{ox}$, and an incremental extent of reduction, $\delta_{inc,i} = \delta_{TR,i} - \delta_{TR,i-1}$. For the first chamber (labelled "0") $p_{TR} = p_{TR,0}$ and $\delta_{TR,-1} = \delta_{WS}$. Being a well-characterized candidate material for solar-thermochemical fuel production, $CeO_2$ is assumed as the reactive oxide. Because $\delta(p_{TR}, T_{TR})$ for $CeO_2$ follows a complicated relationship, $p_{TR,i}$ is determined numerically for several values of $p_{TR,0}$, in a relevant pressure range. FIG. 4 shows the results of these calculations.

The potential for $p_{TR}$ improvement in a cascade is excellent—an order of magnitude $p_{TR}$ decrease can be achieved in as few as five chambers, compared to a single-chambered reactor. The linear and near-identical $p_{TR,0}/p_{TR,i}$ relationship for all considered values of $p_{TR,0}$ is particular to ceria. Other materials should be expected to exhibit a different $p_{TR,0}/p_{TR,i}$ dependence.

FIG. 4 is a plot showing the pressure ratio between the 0th and ith chamber for a ceria based thermochemical reactor. As can be seen in FIG. 2, a 10-fold $p_{TR}$ decrease corresponds to a roughly 7% absolute solar efficiency increase.

Referring to FIG. 4, it can be seen that a line fit to the data is approximately:

$$P_{TR,0}/P_{TR,i} = 2.32 * i + 1.05$$

Thus, for the set of criteria used for determining the ratio of pressure change, the ratio of pressure change between reduction reactors can be determined. In this exemplary embodiment, the change from the first to second reduction chamber is approximately 2.5 times for the range of initial reduction pressures addressed. It is assumed that the change from the first to second reduction chamber would be equal to or greater than approximately 2.5 times for other redox materials for the range of initial reduction pressures addressed.

Since the use of multiple chambers is beneficial, it may seem appealing to assume that arbitrarily many can be used. For example, starting with $p_{TR,0} = 40$ Pa, and extending the trend in FIG. 4 to 50 chambers, leads to $p_{TR,50} \approx 0.35$ Pa—a tempting value from an efficiency perspective! However—because $p_{TR,i} \sim \delta_{inc,i}$ (eq. 8)—in every subsequent chamber $\delta_{inc,i}$ decreases, thus limiting number of chambers in practice.

One limit follows from the power per chamber ($P_i$): in an approximation in which the enthalpy of oxide reduction, $\Delta H$, is independent of or weakly dependent on $\delta$, a decreasing $\delta_{inc,i}$ means a decreasing $P_i \sim \delta_{inc,i}$. For example, assuming that heating between $T_{WS}$ and $T_{TR}$ is accomplished prior to thermal reduction, and that the solar input power in the $0^{th}$ chamber is $P_0 = 3$MW (used entirely for thermal reduction), then $P_5$ would be a reasonable 235 kW, but $P_{50}$ would be only 26 kW. Delivering such low power to into a chamber through a finite aperture (at $C_A \approx 3000$) would be challenging in a tower-heliostat configuration, even if mitigation methods are devised.

The finite angular diameter of the Sun ($\phi \approx 9$ mrad) and windowed-aperture size limits ($A_A \approx 1$ m²), for example, limit the heliostat-aperture distance to ≈110 m, constraining tower heights and heliostat field sizes. Costs associated with a large number of chambers, each additional one bringing a diminishing efficiency benefit, should also be considered.

Irrespective of limitations, the above results indicate that at least a 10 to 20-fold $p_{TR}$ decrease can be achieved in a pressure cascade, which brings the minimum practical $p_{TR}$ to 1 Pa or less. Under realistic operating circumstances, the resulting $\delta_{TR}$ increase can lead to a substantial efficiency advantage compared to equivalent single-chambered designs.

To maintain a pressure difference between neighboring chambers, oxygen flow between them must be negligible. This requirement means that the flow between the $i^{th}$ and the preceding chamber, at pressures $p_{TR,i}$, and should be $\dot{V}_{i,i-1} \ll \dot{V}_{O_2}$.

According to an embodiment, placing airlocks or other gas restriction devices may be placed between chambers that would allow a quasi-continuous oxide flow and reactor operation, while restricting oxygen cross-flow. In an embodiment, the gas restriction devices may be double valves that open asynchronously.

According to another embodiment, a pressure separation method is used wherein the reactive oxide is in the form of a moving packed bed. In this design, the oxide bed itself acts as a pressure separation agent between chambers, owing to the low gas permeability of packed particle beds, governed by Darcy's law. Compared to free Hagen-Poiseuille flow, the flow restriction factor depends on the bed permeability, and is $>10^6$ under conditions expected in a reactor for thermochemical fuel production. In this approach, pressure separation between two chambers can be quantified via the volumetric flow through a packed bed:

$$\dot{V}_{i,i-1} = \frac{kA\Delta p_{TR,i}}{\mu L}. \qquad (9)$$

Here, $k \approx 10^{-11}$ m$^2$ is the bed permeability (typical for fine to medium-sized particulate materials), and $\Box \approx 10^{-4}$ Pa s is the gas dynamic viscosity. For a typical $p_{TR,0} < 100$ Pa, the pressure difference between chambers can be taken as $\Box p_{TR,i} \approx 25$ Pa. $L \approx 1$ m and $A \approx 100$ cm$^2$ are the length and cross-section area of a connection between chambers. Under these assumptions, $\dot{V}_{i,i-1} \approx 3*10^{-8}$ m$^3$/s—a value vastly smaller than the expected $\dot{V}_{O_2} \approx$ $$\dot{V}_{O_2} \approx \frac{100 m^3}{s} /MW$$

(power normalization with respect to $P_S$). This exceptional flow restriction means that oxygen exchange between chambers would effectively consist only of the gas in the bed void fraction ($\dot{V}_{void}$), itself proportional to the oxide volumetric flow $\dot{V}_{ox}$. For a well-performing oxide ($\Box\Box \Box 0.2$) with a reasonable molar mass ($M_{ox} \sim 0.2$ kg/mol), a bed density ($\Box = 4000$ kg/m$^3$), and a void fraction $$\boxed{\dot{V}}_{oid} = 50\% = \frac{\dot{n}_{H_2} M_{OX} \phi}{\rho \Delta \delta} \approx \frac{10^{-4} m^3}{s} /MW$$

—also vastly smaller than $\dot{V}_{O_2}$. These results give confidence that pressure separation between chambers in a cascade can be accomplished under all imaginable practical circumstances, including a wide range of particle sizes.

Figure 5:
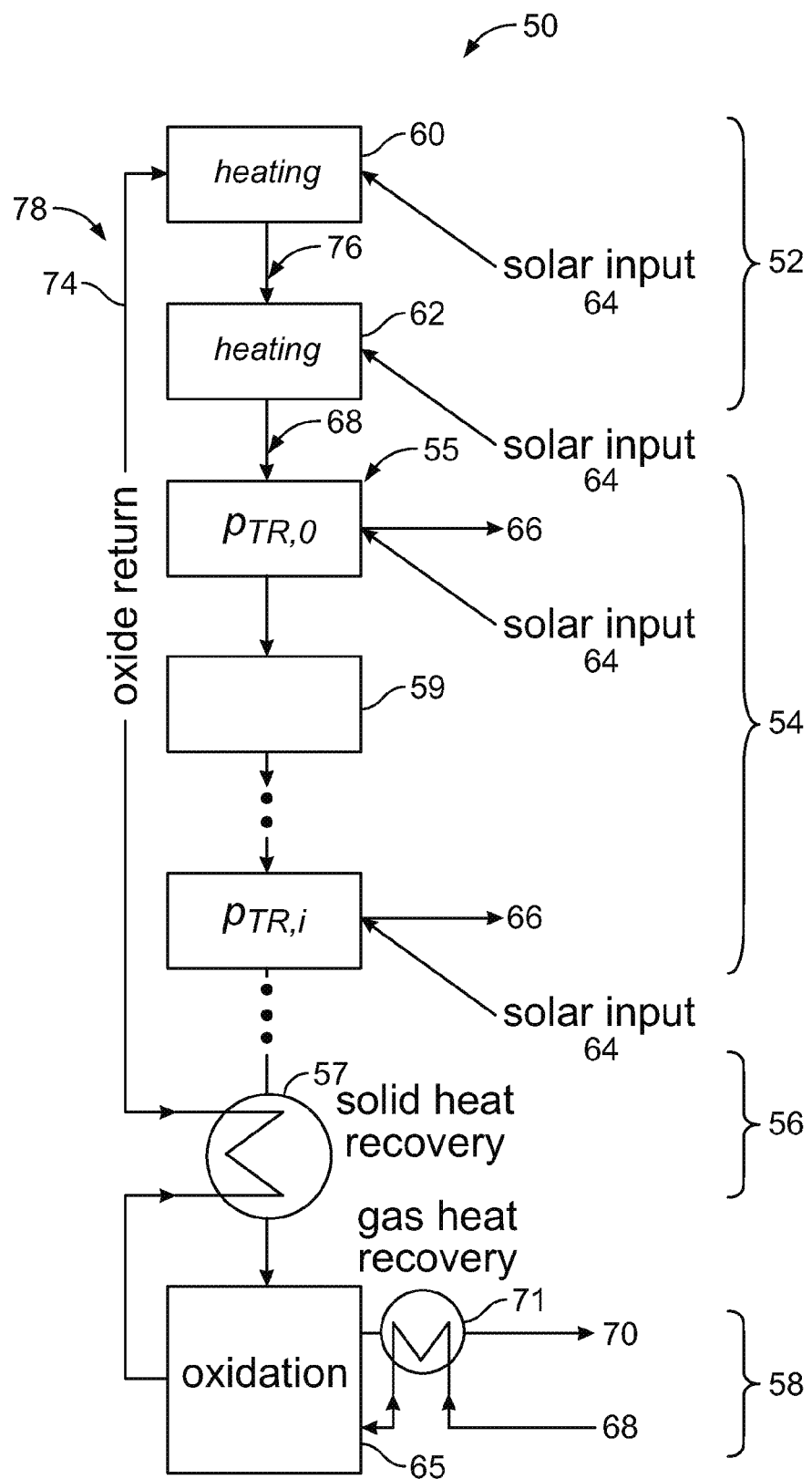
FIG. 5 is an illustration of a reactor according to another embodiment of the disclosure.

FIG. 5 illustrates a schematic of a cascading pressure thermochemical reactor 50, hereinafter referred to as "reactor," according to an embodiment of the disclosure. As can be seen in FIG. 5, the reactor 50 includes a heating zone 52, a reduction zone 54, a heat recovery zone 56 and an oxidation zone 58. The term "zone" as used herein is intended to include a reactor or an area of a reactor where the zone function takes place.

The heating zone 52 includes a first heating reactor or zone 60 and a second heating reactor or zone 62. The first and second heating zones 60, 62 heat the particles up to the particle thermal reduction temperature. In an embodiment, the particles may be heated up to a temperature less than the particles nominal reduction temperature. In another embodiment, the particles may be heated up to 1100° C. In an embodiment, the particles may be heated up to 1150° C. In an embodiment, the first heating zone 60 may heat the particles up to 1150° C. and the second heating zone 62 may heat the particles up to 1300° C. The first and second heating zones 60, 62 receive solar input 64 that heats the particles to less than or equal to the particles reduction temperature. In an embodiment, solar input 64 may be provided by a solar power concentrator, such as provided by an array of solar concentrator mirrors. It should be appreciated by an artisan that windows or lenses would be incorporated into the first and second heating zones 60, 62 so as to allow the solar input 64 to heat the particles. In another embodiment, the heating zone 52 may include one or more heating zones. In another embodiment, the heating zone 52 may also include reduction of the particles. In other words, reduction of the particles may take place in the heating zone at a temperature greater than or equal to the nominal reduction temperature of the particles.

The reduction zone 54 includes a series of reduction reactors or sub-zones 55, $p_{TR,0}$ through $p_{TR,i}$. In the reduction zone 54, the particles receive solar input 64 to heat the particles to a temperature greater than or equal to the particles reduction temperature. As the particles are reduced, a reduction or decomposition product stream 66 is removed from the reduction zone 54. In an embodiment, the reduction product may be oxygen ($O_2$). For example, during the reduction of a redox active material or reactive metal oxide, oxygen would be the reduction product. In an embodiment, the reduction zone 54 may include two or more reactors or sub-zones operating at progressively reduced pressure (progressively reduced in the direction of particle flow). In an embodiment, the reduction temperature may be greater than 1200° C. In an embodiment, the reduction temperature may be greater than 1350° C. In an embodiment, the reduction temperature may be greater than 1400° C. In an embodiment, the pressure of a first reduction reactor or zone is between about 10 Pa and 1000 Pa. In another embodiment, the pressure of a first reduction reactor or zone is between about 10 Pa and 100 Pa. In another embodiment, the pressure of a first reduction reactor or zone is between about 10 Pa and 30 Pa.

In an embodiment, the reactor 50 may include one or more pressure isolation devices 59 between the one or more reduction reactors or sub-zones 55 that allow for the one or more reduction reactors or sub-zones 55 to operate at progressively lower pressures as discussed above.

The reactor 50 may include a heat recovery device or zone 56 configured to remove heat from particles leaving the reduction zone and transfer that heat to particles being provided to the heating zone so as to pre-heat the particles provided to the heating zone. In an embodiment, the heat recovery zone 56 may be a solid heat recovery device 57. In an embodiment, the heat recovery zone 56 may transfer sufficient heat to the particles in the particle return section 74 to heat the particles in the particle return section to a temperature greater than 800° C. In an embodiment, the heat recovery zone 58 may transfer sufficient heat to the particles in the particle return section 74 to heat the particles in the particle return section to a temperature greater than 1000° C.

The particles leaving the heat recovery zone 58 are provided to the oxidation zone 58. The oxidation zone 58 includes an oxidation reactor 65. In the oxidation reactor 65, the particles undergo an oxidation reaction in the presence of a feed stock 68, which is provided to the oxidation reactor 65. The particles release an oxidation product from the oxidation reaction. In an embodiment, oxidation may take place at an oxidation temperature less than or equal to 1100° C. In an embodiment, oxidation may take place at an oxidation temperature less than or equal to 800° C.

In an embodiment, the feed stock 68 may be water or steam ($H_2O$) and the oxidation product 70 may be hydrogen. This reaction may be referred to as water splitting. In another embodiment, the oxidation zone 58 may include one or more oxidation reactors. The oxidation zone 58 may also include a feedstock pre-heater that is configured to transfer heat from the oxidation product to the feed stock so as to pre-heat the feedstock. In an embodiment, the oxidation zone 58 may include a feed stock pre-heater 71 that transfers or recovers heat from the oxidation product 70 to the feed stock 68 so as to pre-heat the feed stock before entering the oxidation reactor 65.

The reactor 50 further includes a material transport system 72 that transports particulate between the reactor components or zones. The material transport system 72 may include conveyors, augers, belts, conduits and/or other material conveyance devices for the transport of material. For example, the material transport system may include screw conveyors that lift particles and conduits through which particles fall or cascade.

The material transport system 62 includes a particle return section 74 that receives particles from the oxidation zone 60 and transports them to the first heating zone 52, a heating zone section 76 that transports particles between the first and second heating zones 60, 62, a reduction zone section 78 that transports particles to, within and from the heating zone 52, and an oxidation zone section 80 that transports particles to and within the oxidation zone 58. In an embodiment the heating zone, reduction zone and the oxidation zone sections 76, 78, 80 may be conduits through with particles fall or cascade by gravity.

According to another embodiment, the feedstock may be carbon dioxide, and the oxidation product is carbon monoxide and the reduction product stream is oxygen.

As so described, the artisan will appreciate that with many independent design parameters, a design protocol for the reactors described herein may include first determining thermal reduction properties of the reactive particles (e.g., reaction kinetics at a chosen reduction temperature and oxygen partial pressure). A solar concentrator power, overall particle mass flow rate through the reduction chamber, and feed stock pumping speed may be independently set to establish the desired reduction temperature, pressure, and residence time within the reactor. Similarly, the production temperature, and production residence time may be set by appropriate component sizing and adjusting the flow of the reactant fluid (two more independent parameters).

It is to be understood that the above description is illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A solar thermochemical reactor comprising:
   a thermal reduction zone to thermally reduce a plurality of reactive particles through direct heating by solar energy thereby producing a plurality of reduced particles;
   wherein the thermal reduction zone comprises two or more thermal reduction sub-zones operating at a corresponding two or more decreasing pressures;
   wherein the two or more thermal reduction sub-zones receive separate solar inputs; and
   wherein the pressure decreases in the direction of particle flow.

2. The solar thermochemical reactor of claim 1, wherein the thermal reduction zone is heated by solar input.

3. The solar thermochemical reactor of claim 1, wherein the two or more thermal reduction sub-zones are two or more reduction reactors.

4. The solar thermochemical reactor of claim 1, wherein the particles are first reduced in a first reduction reactor of the two or more reduction reactors, and the first reduction reactor is at a pressure of between 10 Pa and 1000 Pa.

5. The solar thermochemical reactor of claim 1, wherein the two or more thermal reduction sub-zones operate at a temperature greater than 1200° C.

6. The solar thermochemical reactor of claim 1, further comprising:
   a heating zone configured to heat the plurality of reactive particles through direct heating by solar energy to a temperature less than the plurality of reactive particles nominal reduction temperature.

7. The solar thermochemical reactor of claim 1, wherein reduction of the plurality of reactive particles in the thermal reduction zone produces a reduction product stream.

8. The solar thermochemical reactor of claim 6, wherein the reduction product stream comprises oxygen.

9. The solar thermochemical reactor of claim 1, further comprising:
   an oxidation zone for receiving the plurality of reduced particles;
   wherein the plurality of reduced particles undergo oxidation in the oxidation zone thereby reducing a feedstock and forming an oxidation product.

10. The solar thermochemical reactor of claim 1, wherein the oxidation product is hydrogen.

11. A method for reducing a redox active material, comprising:
    thermally reducing a plurality of reactive particles in a thermal reduction zone through direct heating by solar energy to produce a plurality of reduced particles;
    wherein the thermal reduction zone comprises two or more thermal reduction sub-zones operating at a corresponding two or more decreasing pressures;
    wherein the solar energy directly heats by separate solar inputs to the two or more thermal reduction sub-zones; and
    wherein the pressure decreases in the direction of particle flow.

12. The method of claim 10, wherein the thermal reduction zone is heated by solar input.

13. The method of claim 10, wherein the two or more thermal reduction sub-zones are two or more reduction reactors.

14. The method of claim 10, wherein the particles are first reduced in a first reduction reactor of the two or more reduction reactors, and the first reduction reactor is at a pressure of between 10 Pa and 1000 Pa.

15. The method of claim 10, wherein the two or more thermal reduction sub-zones operate at a temperature greater than 1200° C.

16. The method of claim 10, further comprising:
heating zone the plurality of reactive particles in a heating zone through direct heating by solar energy to a temperature less than the plurality of reactive particles nominal reduction temperature.

17. The method of claim 10, wherein reduction of the plurality of reactive particles in the thermal reduction zone produces a reduction product stream.

18. The method of claim 16, wherein the reduction product stream comprises oxygen.

19. The method of claim 10, further comprising:
oxidizing the plurality of reduced particles in an oxidation zone;
wherein oxidation in the oxidation zone reduces a feedstock and forms an oxidation product.

20. The method of claim 10, wherein the oxidation product is hydrogen.

\* \* \* \* \*